United States Patent Office 3,618,170
Patented Nov. 9, 1971

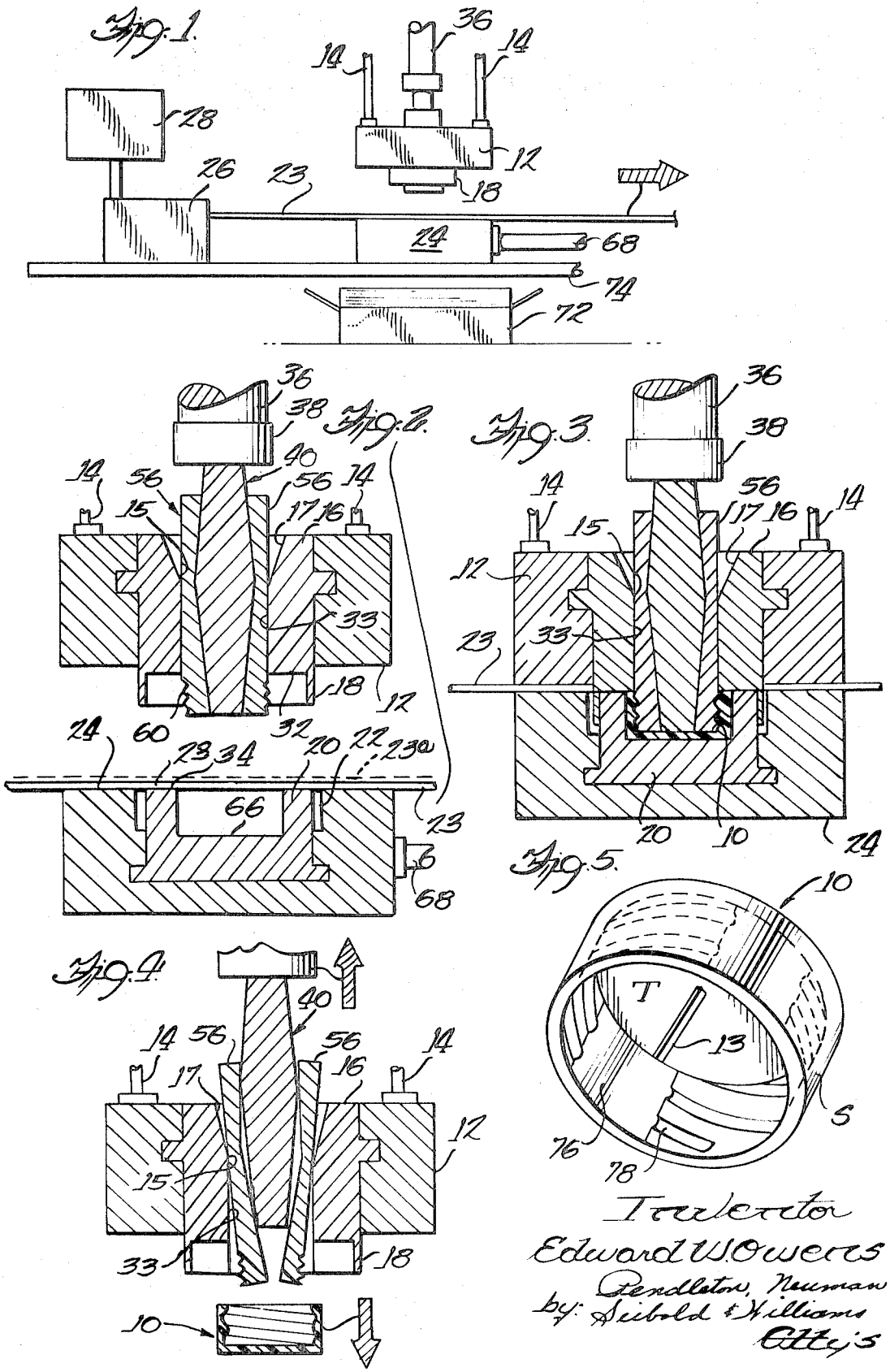

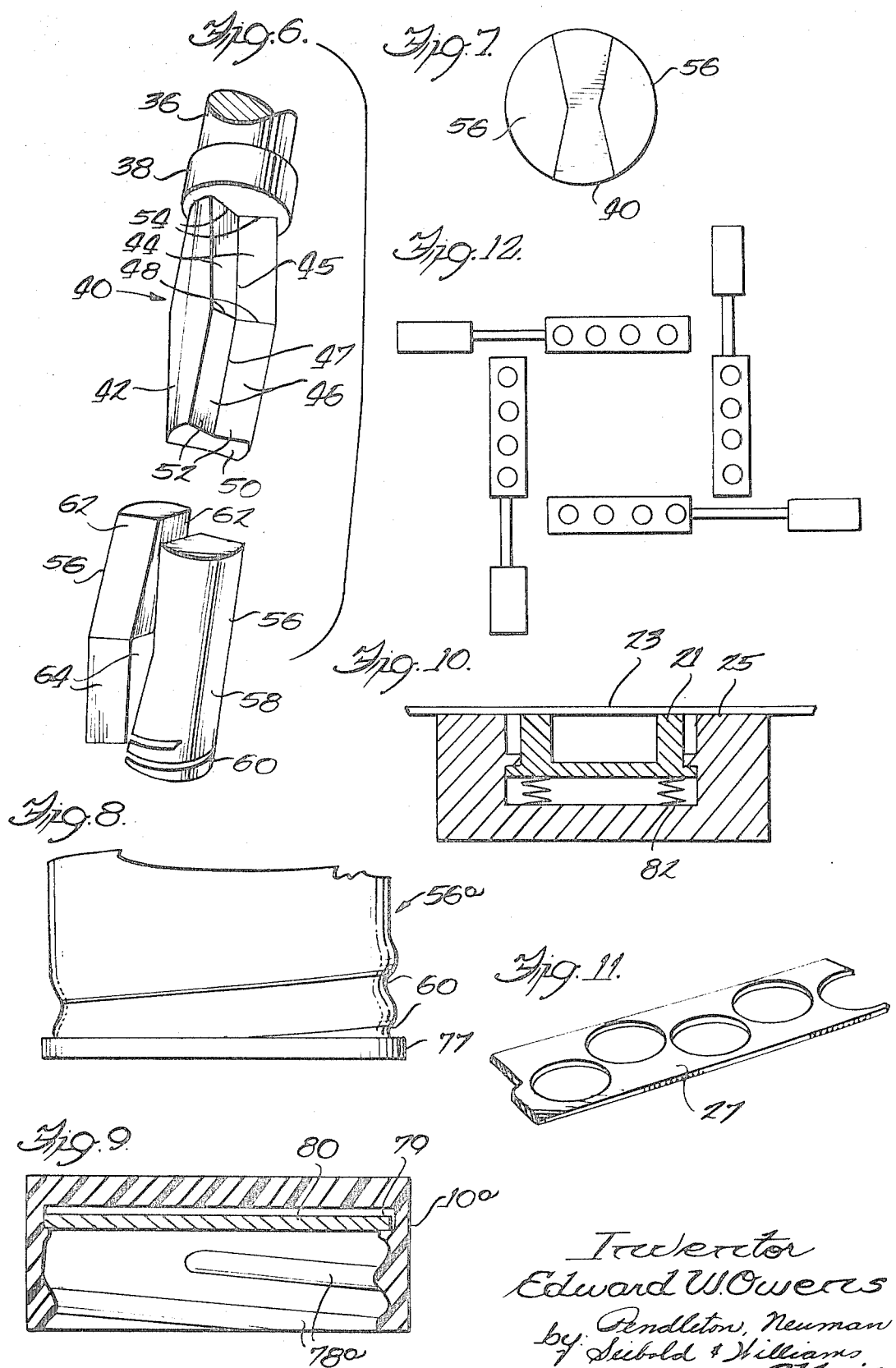

3,618,170
APPARATUS FOR MOLDING PLASTIC CLOSURES
Edward W. Owens, Palatine, Ill.
(4702 Valley Ridge Court, Toledo, Ohio 43614)
Filed July 14, 1969, Ser. No. 841,208
Int. Cl. B29c *11/00;* B29d *1/00;* B29f *1/14*
U.S. Cl. 18—30 WM
8 Claims

ABSTRACT OF THE DISCLOSURE

In a method for pressure molding plastic materials, a strip of deformable plastic is extruded over a mold cavity. A predetermined piece of the extrudate is cut from the strip and formed in the mold under pressure by means of a collapsible core and bushing assembly which forms the plastic at relatively low pressure in conjunction with the forming surface of a mold cavity.

The collapsible core assembly includes a slidably movable actuator and mating thread-forming portions which engage such actuator whereby adjacent end portions of said forming portions are forced apart at first end portions, and approach each other and are readily released from a molded piece at opposed second end portions.

BACKGROUND OF THE INVENTION

Field of the invention

This invention relates to a novel collapsible core apparatus employed for low-pressure molding of plastic articles.

Description of the prior art

The injection molding of even the smallest plastic article entails the utilization of expensive and complex apparatus, as exemplified by molding apparatus adapted to mold small plastic articles such as threaded closures for plastic and glass bottles.

A typical injection molding machine for such closures costs in excess of fifty thousand dollars. Such apparatus employs forming elements which are subjected to elevated temperatures in the neighborhood of 500° F., and pressures in the general range of 20,000 pounds per square inch. Apparatus components subjected to such conditions must be extremely rugged, necessitating the utilization of durable and expensive materials of composition and a continuous program of apparatus repair and replacement.

In the injection molding of small plastic pieces such as threaded closures, a threaded core in combination with a mold cavity defines a forming volume in which a thermoplastic such as polypropylene may be injected under pressure at an elevated temperature of the magnitude above indicated. The core, which is normally chrome plated or formed of other heat-resistant and expensive material of composition must be reciprocally moved relative to the mold cavity and unscrewed from the molded piece, necessitating the utilization of a lubricant. Such lubricant, in addition to comprising an expense of manufacture, also comprises a source of contamination of the finished closure, often causing unsightly staining of the molded pieces. Such contamination is particularly objectionable when the lubricant-bearing closure is employed with a container for foods or medicines.

In accordance with this invention, deformable plastic materials such as thermoplastics in a flowable state are molded under low pressure between forming surfaces defined by a mold cavity and a novel collapsible core. The collapsible nature of the core enables the same to be positively released from the molded piece in a fraction of the time previously deemed necessary, inasmuch as there is no necessity of unthreading the core relative to such piece.

Although the use of a collapsible collet is disclosed in U.S. Pat. No. 2,560,291 granted July 10, 1951, the release of the collet sections from the molded piece is dependent upon the ability of such sections to return to their original positions relative to a connecting base portion. The release "spring" in the collet sections will obviously decrease with use and eventually result in the absence of release of the molded piece from the collet sections. The collapsible core of this invention, however, employs a positive collapsing force assuring release of the core components from the molded piece, thereby assuring the expenditure of a minimum amount of processing time in the course of article formation.

SUMMARY

It is an object of this invention, therefore, to provide a novel core for low-pressure forming of plastic articles in which the pressure and low temperature conditions for carrying out the process enable relatively inexpensive molding apparatus components to be employed.

It is another object of this invention to provide novel, low-pressure molding apparatus employing a minimum number of moving components, thereby dispensing with the need for a lubricant and avoiding the attendant disadvantages.

It is another object of this invention to provide novel molding apparatus employing a multi-part, reusable, inwardly collapsible core which enables such core to be readily released from the molded article despite the presence of thread formations or other protuberances on the core surface.

It is a further object of this invention to provide a novel, collapsible molding core and bushing assembly which employs a plastic actuating piece requiring no lubricant and which is adapted to positively force interfitting thread-forming portions of the core to collapse and approach the core center upon longitudinal axial movement of such plastic piece.

It is another object of this invention to provide novel, versatile, low-pressure molding apparatus which may be readily altered to simultaneously produce varying articles and article sizes at high rates of speed.

It is a further object of this invention to provide an apparatus which is adapted to process a plurality of plastic webs of different composition and/or color into a single unitary plastic article.

It is another object of this invention to provide a novel apparatus for the low pressure formation of plastic articles which avoids the formation of flow lines and lines of weakness inherent in injection-molded articles.

It is a still further object of this invention to provide novel molding apparatus employing a cavity having a movable bottom whereby the applied pressure will automatically adjust the apparatus elements to provide a molded article of desired form.

The above and other objects of this invention will become more apparent from the following detailed description when read in the light of the accompanying drawings and appended claims.

DESCRIPTION OF THE DRAWINGS

FIG. 1 is an elevational view of apparatus employed in the low-pressure molding of plastic pieces in accordance with this invention;

FIG. 2 is a fragmentary sectional view, partly in elevation, illustrating a mold and collapsible core assembly made in accordance with this invention and adapted to mold a threaded closure from a plastic strip;

FIG. 3 is a sectional view of the components illustrated in FIG. 2 in interfitting engagement, shown in the step of forming a threaded closure;

FIG. 4 is a sectional view similar to FIG. 3 illustrating the core in the process of collapse whereby the formed plastic closure is released from end portions of the split thread core portions utilized;

FIG. 5 is a perspective view of a plastic closure member formed from the apparatus of FIGS. 1 through 4;

FIG. 6 is an exploded view of an unthreaded core actuator and split thread core employed in the apparatus of the subject invention;

FIG. 7 is a transverse sectional view of the collapsible core components of FIG. 6 in assembled relationship;

FIG. 8 is a fragmentary elevational view of a modified thread core member;

FIG. 9 is a sectional view, partly in elevation, of a plastic closure member which has been formed utilizing the modified thread core of FIG. 8, and illustrating a discrete liner member disposed in place therein;

FIG. 10 is a sectional view of a modified mold and a mold holding plate which may be utilized in accordance with the teachings of this invention;

FIG. 11 is a perspective view of an extruded plastic strip indicating the manner whereby portions thereof may be cut out in the process of forming discrete plastic closure members; and FIG. 12 is a schematic representation of the manner in which batteries of extruders and closure-forming elements may be arranged for mass production of plastic closures made in accordance with this invention.

DESCRIPTION OF THE INVENTION

Referring now to the drawing, apparatus is therein illustrated for the low-pressure molding of plastic articles such as internally-threaded plastic closure 10 illustrated in FIG. 5. As above pointed out, the injection molding of plastic articles is well known; however, such molding operations require the utilization of extremely expensive apparatus and extremely high operating pressures and temperatures. As a consequence, apparatus components employed in injection molding are expensive and subject to rapid deterioration due to the extreme physical conditions under which they operate.

In the injection molding of plastic articles, the molded article comprising the finished product possesses internal stresses by virtue of the manner in which the plastic is injected under high pressure into a confined molding volume. As a result of the injection molding operation visible flow lines are also present in the molded piece, and gate marks are present in the piece which comprise points of weakenesses in the structure. The apparatus elements employed in the normal injection molding operation are rather complex in nature, slow-moving in operation because of the great pressures utilized and require extended set-up time if new article sizes or new pieces are to be formed.

As will be apparent from the following, the novel low pressure method of plastic formation hereinafter described in detail enables a molded piece to be formed at relatively low temperatures with the utilization of inexpensive apparatus elements which are rapidly changed in a minimum of set-up time. Because of the low temperature conditions under which the molding process hereinafter described is carried out, no time allowances need be made for the shrinkage of the plastic material being molded. As a result, plastic articles of different sizes and shapes as well as similar articles of different thicknesses may be simultaneously molded with resulting products of uniform high quality. The flashing normally present in injection molded pieces is not found in the low pressure molded pieces hereinafter described.

In FIG. 1, a bushing mounting plate 12 is illustrated which is reciprocally movable in the vertical plane by means of a plurality of actuating piston rods 14 which are instantaneously actuated by pneumatic pressure flowing in pneumatic cylinders, not illustrated, from which the rod members 14 project. Mounted in the plate 12 is a bushing 16 having a depending cutter skirt 18 adapted to snugly engage the outer periphery of underlying cavity mold 20 mounted in plate 24 and having annular recess 22 formed therein for reception of the skirt portion 18 during a cooperative shearing action, see FIG. 2.

In the normal course of operation, a thin plastic strip such as strip 23 illustrated in FIG. 1, is extruded by means of extruder 26 in the direction of the arrows as illustrated. Virgin or reprocessed plastics or a mixture of the same, such as polyethylene or polypropylene, may be fed into the extruder 26 by means of hopper 28. Plastic strip 23 is fed over the top of mold 20 as illustrated in FIG. 2, whereafter the bushing plate 12 and bushing 16 mounted therein are actuated downwardly so that a circular plastic piece is cut from the strip 23 and squeezed from between lower annular shoulder 32 of the bushing 16 and the upper annular rim 34 of the mold 20.

In this first downward movement of the bushing and bushing plate, central piston rod 36 secured to collar 38 of core actuator 40 does not move but is retained in fixed position. Piston rod 36 is also an extending rod from a pneumatic cylinder, not illustrated.

Core actuator 40 has opposed curved side portions 42 from which inwardly extend radial upper planar surface portions 44 and radial lower planar surface portions 46. Surfaces 44 meet along line of juncture 45 and surfaces 46 meet along line of juncture 47. Upper surfaces 44 and lower surfaces 46 also meet along lines of juncture 48. Lower planar surfaces 46 join lower end 50 of the actuator 40 along lines 52 and upper surfaces 44 join collar 38 along lines 54 in the manner illustrated in FIG. 6. The planar surfaces illustrated in FIG. 6 have twin surfaces oppositely disposed thereto not seen in FIG. 6.

Also illustrated in FIG. 6 are split thread core portions 56 which are adapted to engage the unthreaded central core actuator 40 so as to define a substantially uniform cylinder having thread-forming end portions spaced from collar 38. Each thread core portion 56 has an outer curved surface portion 58 in which are formed female recesses 60 adapted to form male threads of a plastic closure in the normal course of molding hereinafter described. Oppositely disposed to each curved surface portion 58 of each thread core portion 56 are upper planar surfaces 62 adapted to engage in face-to-face relationship upper surface portions 44 of the core actuator 40 illustrated in FIG. 6. Each thread core portion also has lower planar surface portions 64 adapted to engage the opposed lower planar surface portions 46 of the core actuator 40. In the assembled condition the core actuator and split thread cores form a cylinder as illustrated in the sectional view of FIG. 7, as well as in the assembly views of FIGS. 2 and 3.

In a second forming step following cutting of a plastic disc by skirt 18, the core assembly comprising the core actuator 40 and the opposed split thread core portions 56 descend as a unit, driven by piston rod 36. Surfaces 46 of actuator 40 wedge the portions 56 against uniform-diameter portion 33 of the bushing thereby retaining the flowable plastic in the desired forming volumes. The core assembly simultaneously enters into die cavity 66 of cavity mold 20, forming the plastic disc into the desired article configuration 10 illustrated in FIGS. 3 and 5 with the assistance of bushing shoulder 32.

The actuator 40 and split thread cores or dies 56 may be continually maintained in a position of assembly by being continually in contact with the uniform-diameter passageway portion 33 of the bushing 16. Portions 56 may also be retained to the bushing 16 by pins or equivalent means not illustrated. Thus in the initial cutting step wherein the cutter skirt 18 cuts a disc from the plastic strip 23, the core assembly comprising components 40 and 56 may downwardly move with the bushing 16 so as to be retained in assembled position therewith and centered thereby. The core assembly, however, stops short of the mold cavity 66, thereby allowing the bushing 16 and bushing plate 12 to proceed into the position illustrated in FIG. 3. In a second step, the core assembly disposed slightly above the upper surface of the mold 20 depends into the mold cavity 66 assuming the position illustrated in FIG. 3.

Since the plastic strip 23 has just been extruded from extruder 26, it will be at a temperature of approximately 200° F. and thus readily flowable into the desired article configuration illustrated in FIG. 3. The time lag between the extrusion step and the molding step may be adjusted to obtain the desired temperature conditions. Also mold mounting plate 24 may be appropriately cooled by water-conducting passageways or equivalent means to attain a desired rate of heat dissipation. Although a threaded closure has been presented by way of example, it is apparent that other similar items having surface projections may be molded in an analogous manner wherein a smooth actuator forces collapse of forming members which may have surface projections. Since the extruded strip 23 has cooled significantly from the temperature of about 500° F. present in the extruder, problems of contraction and expansion are not encountered in the molding step just described. Also, the moderate molding temperature enables a self-lubricating plastic actuator 40 to be utilized which may be formed of Teflon or the like. The absence of lubricants avoids a contamination problem existent with the use of metal actuators at higher molding temperatures.

The pressure exerted by the annular shoulder 32 of the bushing 16 against the upper rim 34 of the mold 20 should be greater than the pressure generated by the downward movement of the assembly of the core actuator 40 and split thread core portions 56 into the mold cavity. By way of example, a polyethylene strip may be cut by means of the cutter 18 whereafter the core assembly moves downwardly at a pressure of about 38 lbs. per square inch or 2 lbs. per square inch less than the 40 lbs. per square inch forming the seal at the interface between surfaces 32 and 34 of the bushing and mold, respectively.

Following the molding step illustrated in FIG. 3, the bushing plate and bushing may move upwardly as a unit together with the core assembly comprising the central core actuator 40 and the split thread core portions 56. In a second movement the bushing and bushing plate remain stationary as the core actuator moves upwardly in the manner illustrated in FIG. 4, simultaneously camming the upper planar portions 62 of the split thread core portions 56 apart as the widest portion of the core actuator 40, defined by lines of juncture 48, moves upwardly along the surfaces of the thread core portions 56.

It is apparent from FIG. 4 that in the course of such upward movement of the core actuator the portions 56 will move apart at their upper end limits in upper bushing chamfered portion 17 and move together at their opposed end limits which initially had engaged the molded piece 10. Portions 56 will pivot about edge 15 defining the lower edge of conical recess portion or chamfered portion 17. As a result of the inward movement of the latter portions of the split thread core portions having the threads 60 formed therein, the molded piece 10 will be released to drop downwardly in the direction of the illustrated arrow.

Prior to the upward movement of the core actuator 40 illustrated in FIG. 4, the mold plate 24 in which the mold 20 is mounted may be moved to one side as by means of illustrated piston arm 68 illustrated in FIGS. 1 and 2. After the mold plate 24 has been moved to one side from beneath the assembly of the bushing, bushing plate and core assembly, the cap 10 may freely fall into a receptacle such as carton 72 illustrated in FIG. 1. It will be noted from this latter figure that the mold plate 24 may reciprocally move on supporting rails 74. It will be further apparent from FIGS. 3 and 4 that in the initial upward movement of the core actuator 40 the split thread core portions 56 are prevented from moving upwardly because of the contact of the molded piece 10 against the annular surface portion 32 of the bushing 16. If desired, reciprocating stay elements (not illustrated) may maintain elements 56 against vertical movement during the upward axial movement of the actuator.

The specific configuration of the core actuator 40 need not be that as illustrated in the various figures of the drawing but need only be such configuration as will result in the camming of split thread core portions in the manner illustrated to release the molded piece. The split thread core portions may consist of more than two portions and as a result, the curved portions such as portions 76 of the molded piece 10 illustrated in FIG. 5 will be correspondingly greater than the two portions illustrated. It is seen from this latter figures that the portions of the male threads 78 are maintained in spaced relationship by the smooth portions 76. The smooth unthreaded skirt portions 76 of the closure 10 may function as venting openings preventing the build-up of dangerous pressures within a container whereby excess pressure may bleed past the male threads of a container neck to the container exterior. A notch or groove 13 formed on the undersurface of closure top T or in the terminal rim of a container neck assures pressure passage to vertical venting grooves 76. The illustrated cap may be flexed slightly into an elliptical configuration, enabling the cap to be snapped downwardly in place over the threads of a container neck followed by a slight quarter turn for tightening purposes. Such closure ability to be substantially instantaneously snapped in place and tightened comprises a distinct advantage in the normal course of filling containers where time is at a premium in the normal course of packaging and manufacturing.

FIG. 8 illustrates a modified thread core member 56a, which not only has the female recesses 60 for the formation of the male threads on the molded closure member, but in addition has a terminal annular rib 77 for formation of a corresponding recess 79 (see FIG. 9) in modified cap construction 10a. It will be noted from FIG. 9 that a separate liner member 80 may be snapped in place in the recess 79, dispensing with the need for any adhesive or other means for retaining the liner 80 in place.

To assist in the formation of a uniform high quality product, a modified cavity mold 21 is illustrated in FIG. 10 mounted in the mold plate 25. The assembly of FIG. 10 is adapted to be employed with the core assembly, bushing plate and bushing previously described in FIGS. 1 through 4. It will be noted from FIG. 10, however, that the cavity mold 21 is resiliently movable in the vertical plane by means of the coil springs 82 interposed between the bottom of the cavity mold and the underlying supporting surface portion of the mold plate 25.

It is seen from FIG. 3 that in the event that the plastic piece from which the closure 10 is formed is slightly thicker than is intended for the volume defined by the outer periphery of the core assembly and the inner periphery of the mold cavity 66, the resulting molded piece will have a thickened or heavy top portion T (see FIGS. 3 and 5) and as a result the threaded skirt portion S depending from the top portion T will be shorter than intended because of the downwardly protruding undersurface of the top portion T. Since a lesser quantity of male thread will therefore be formed on the threaded skirt portion S, difficulty may be subsequently encountered in the course of attempting to thread the resulting closure 10 onto a threaded neck of a container or the like.

To assure that the threaded portion of the skirt S is consistently uniform, the spring-biased cavity mold 21 of FIG. 10 will enable the thickened top portion T to extend outwardly on the exterior surface of the closure top T so as not to interfere with the desired internally-threaded skirt portion. The springs 82 of FIG. 10 will of course be designed to give under a predetermined pressure indicative of a too-thick plastic disc. The construction of FIG. 10 assures formation of articles under uniform molding pressure.

FIG. 11 is indicative of the manner whereby the arrangement of the molds and overlying bushings and core assemblies may be predeterminately arranged so as to obtain maximum use of extruded plastic strip 27. The cut-out fragment 27 illustrated in FIG. 11 may be returned to the hopper 28, illustrated in FIG. 1, for reentry into the extruder 26 in the formation of a new plastic strip.

FIG. 12 is representative of the manner whereby batteries of article-forming molds and opposed core members may be arranged in conjunction with extruders so as to simultaneously form a number of plastic articles. Each extruder may simultaneously feed a battery of four or more mold members whereafter a battery of a corresponding number of core assemblies is moved downwardly in the manner previously described.

As previously noted, the expense of the apparatus employed in this low pressure method for forming plastic articles may be anywhere from one-half to one-quarter as great as comparable equipment used in the injection molding of a similar item. In view of the less severe physical conditions of temperature and pressure employed, maintenance costs are reduced and less expensive items may be employed in the formation of the molds and core assemblies. The molding operation previously described may be carried out in a fully automatic operation without the attendance of any human agency. The novel camming action made possible by virtue of the design of the aforedescribed core actuator and mating portions of the split thread core portions results in positive disengagement of the die pieces from the molded piece and prevents "hanging up" of the molded piece on any portion of the core assembly. Both thread core portions 56 must release from the molded piece in the step illustrated in FIG. 4 since the cap is positively forced from each piece 56 with the assistance of the opposite piece 56. It is apparent that in the battery arrangement illustrated in FIG. 12 each core represented by means of a circle may comprise a different article size inasmuch as the piece being molded may be molded in approximately the same amount of time regardless of differences in material of composition and thicknesses of the item being produced.

A further advantage of the process heretofore described comprises the fact that layers of plastic strips such as 23 and 23a illustrated in FIG. 2 may be simultaneously cut by means of the bushing cutter 18 prior to formation of the molded piece 10 in the following step of FIG. 3. Since the plastic strips are at a temperature of about 200° F., the strips may be welded together in the course of the molding operation, and if formed of different colors, will provide an attractive item where color is of importance.

Also, the use of multiple layers in low-pressure molding of plastic items such as the item 10 previously described, enables the use of different plastics to be employed in the formation of a unitary item. Thus the plastic closure 10 may be formed from an outer layer of hard linear polyethylene, whereas the inner surface may be formed of soft low-density polyethylene which desirably serves as a more resilient liner layer without the need for a discrete liner member such as is illustrated in FIG. 9 of the drawing at 80. It is also believed apparent that in accordance with this invention layers of different plastics such as polyethylene and polypropylene may be employed in the formation of the items.

By way of example, an extruder may extrude a ribbon two inches wide and about .07 of an inch thick for purposes of forming a 28 millimeter cap. Each cycle of the molding apparatus previously described may be carried out in approximately four seconds as contrasted with the normal time of 22 seconds for forming comparable articles by means of an injection molding operation.

Although the molding pressure of 38 lbs. is previously given by way of example, it is apparent that the specific pressures and plastics employed for purposes of carrying out this invention may be varied to meet the specific needs of those utilizing the apparatus and method steps above described. Also, although the previous description has been specific with respect to thermoplastic materials, it is apparent that the steps previously described may be carried out equally well with thermosetting materials.

I claim:

1. In apparatus adapted to mold plastic materials, the combination comprising a mold having a cavity and forming surface adapted to receive a plastic material; multi-part core means, means adapted to move said core means into and out of said mold cavity, the portions of said core means entering said cavity being adapted to form plastic material disposed in said mold cavity in conjunction with the cavity-forming surface of said mold; said multi-part core means having an actuator adapted to be moved by the core moving means into an inner core-forming position within said cavity, said core means also having plastic-forming components engaging spaced surface portions of said actuator and being arranged in a forming position when said actuator is in said core-forming position; bushing means having a core-means-receiving passageway; a first portion of said passageway being of substantially uniform diameter and adapted to snugly engage the periphery of said core means when in said core-forming position; said passageway also having a second enlarged portion contiguous with said first portion and adapted to surround forming portions disposed exteriorly of said cavity; said actuator and forming components being maintained in an assembled condition while disposed in said bushing means passageway; the engaging surfaces of said actuator and forming portions being so formed whereby axial movement of said actuator away from said mold spreads apart the end portions of said forming portions disposed exteriorly of said cavity when said core means is in said core-forming position.

2. The apparatus of claim 1 in which said actuator has lower, downwardly converging surface portions adapted to wedge contacting surfaces of said forming portions apart when moving into said mold cavity, and upper upwardly converging surfaces adapted to spread contacting surfaces of said forming portions apart when moving away from said mold cavity.

3. In an apparatus adapted to mold plastic materials the combination comprising a mold having a forming surface defining the interior periphery of a mold cavity and an upper rim surface defining an outer peripheral portion of said cavity, a collapsible core means reciprocally movable relative to said cavity; said core means having spaced forming core segments and an actuator segment which interfits with said spaced forming segments, a bushing having a central passageway adapted to receive a portion of the length of said core means, and a depending shear cutter adapted to snugly engage the outer periphery of said rim surface, means for extruding a deformable plastic material over the top of said mold, means for urging said bushing into engagement with the upper rim surface of said mold, and means for urging said core means through said bushing central passageway into said mold cavity.

4. The apparatus of claim 3 in combination with means for axially moving said core means actuator relative to said forming segments and withdrawing said core means from said mold cavity; said actuator having cam surface portions adapted to spread apart forming core segments during axial movement thereof.

5. The apparatus of claim 3 in which said means for urging said bushing into engagement with said mold rim portion possesses greater force than said means for urging said core means through said bushing central passageway.

6. In an apparatus for molding plastic materials, the combination comprising a bushing having a first passageway of substantially uniform diameter and a second passageway having a diameter greater than said first passageway connected to said first passageway; a collapsible core assembly adapted to be received in said bushing passageways; a longitudinal segment of said core assembly being adapted to be snugly received in said first passageway; said core assembly comprising an axially movable actuator and engaged plastic forming segments defining a core of desired configuration; the mutually engaging surfaces of said actuator and forming segments being so formed whereby said forming segments disposed in said first bushing passageway are urged against surface portions of said first passageway when said actuator is urged in one axial direction; said forming segments disposed in said first bushing passageway being urged together and said forming segments disposed in said second bushing passageway being urged apart when said actuator is urged in a second axial direction opposite to said first direction.

7. The apparatus of claim 6 in which said second passageway has a substantially uniformly increasing diameter as it extends from said first passageway thereby defining a frusto-conical recess in said bushing extending from a line of juncture between said two passageways.

8. The apparatus of claim 7 in combination with means preventing axial movement of said forming segments during said second axial movement of said actuator whereby said forming segments are forced to pivot about said line of juncture.

References Cited

UNITED STATES PATENTS

| | | | |
|---|---|---|---|
| 648,882 | 5/1900 | Ragsdale | 18—2 RS UX |
| 1,637,708 | 8/1927 | Porter | 25—128 R UX |
| 1,916,692 | 7/1933 | Scribner | 18—2 RS UX |
| 2,363,808 | 11/1944 | Sayre | 18—2 RS UX |
| 2,521,520 | 9/1950 | Jancura | 249—63 X |
| 2,676,372 | 4/1954 | Venner et al. | 249—180 |
| 2,948,031 | 8/1960 | Webb | 249—180 UX |
| 3,125,801 | 3/1964 | Fields | 249—59 X |
| 3,247,548 | 4/1966 | Fields et al. | 18—2 RS X |
| 3,280,432 | 10/1966 | Muller | 18—42 D |
| 3,339,242 | 9/1967 | Lamb | 18—2 RS UX |
| 3,482,815 | 12/1969 | Naturale | 18—2 RM X |

J. HOWARD FLINT, JR., Primary Examiner

U.S. Cl. X.R.

18—2 RS, 45 R; 249—59, 63, 142, 180, 184